Patented Feb. 19, 1935

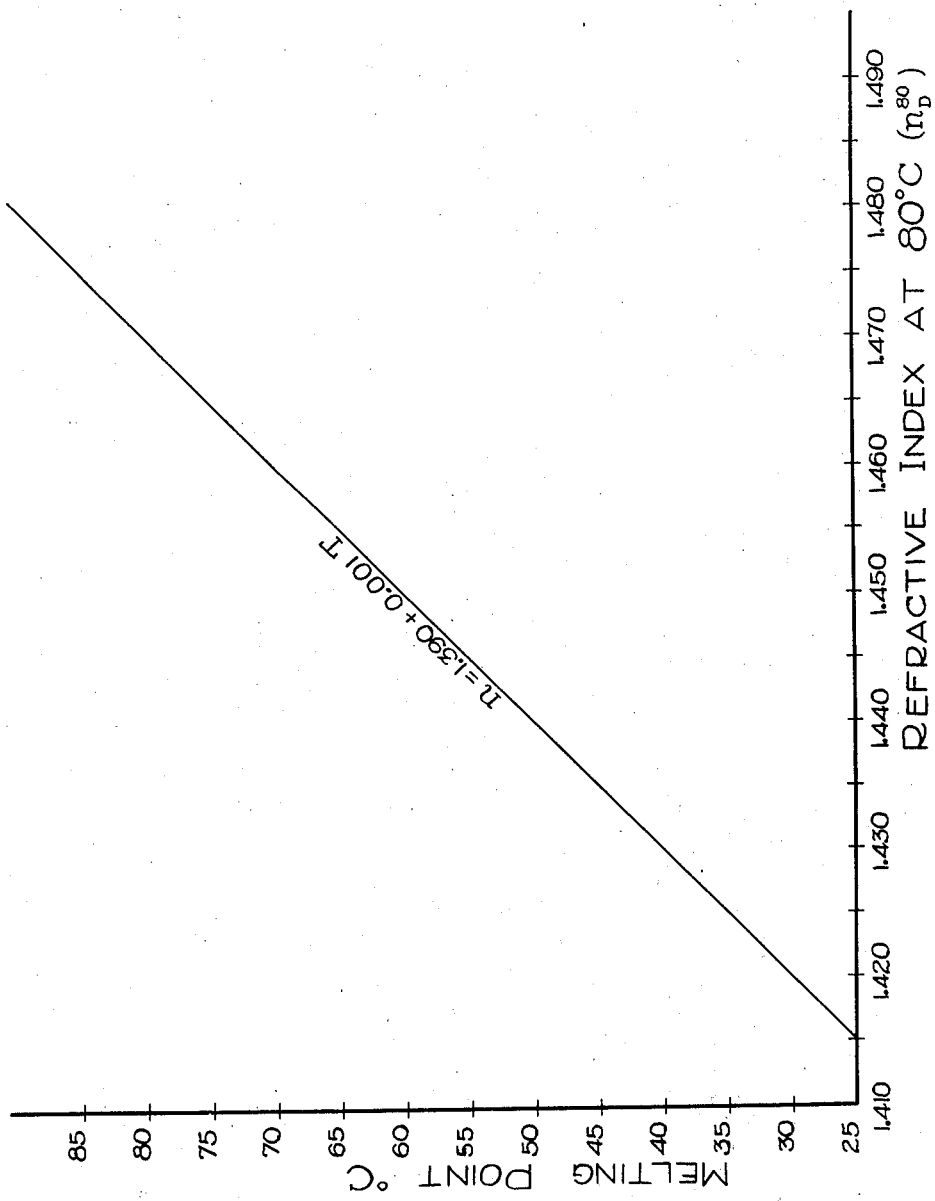

1,991,389

UNITED STATES PATENT OFFICE 1,991,389

SEPARATION OF WAX

Lawrence M. Henderson, Narberth, Seymour W. Ferris, Lansdowne, and Henry C. Cowles, Jr., Philadelphia, Pa., assignors to The Atlantic Refining Company, Philadelphia, Pa., a corporation of Pennsylvania Application March 23, 1932, Serial No. 600,584

19 Claims. (Cl. 196—20)

The present invention relates to improving the sweatability of wax, and has particular utility in the sweating of paraffin wax such as crude slack wax obtained as a cake when wax-bearing oils from petroleum or shale oil, for example, oils commonly known as paraffin distillates, are subjected to filter pressing. Our invention specifically resides in the addition of a crystal form impressing agent to such waxes to improve their sweatability, that is, their sweating qualities.

In the past, to waxes having poor sweating qualities, there was sometimes added another wax, more or less at random, with the hope that the resulting mixture would sweat. Usually, the wax added was known to have good sweating properties. By this practice, however, substances were introduced into the wax, which in themselves, we have found, had no beneficial effect upon the sweatability of the poorly sweating wax, and in fact, in a number of instances, actually hindered sweatability.

Good sweating properties in a wax require that its crystalline structure be such as to allow the oil and low melting wax to readily drain from the higher melting wax when the wax composite is fractionally melted. We have recognized that the needle crystal structure best promotes good sweating because it maintains open the interstices which form between the solid wax crystals on melting, thereby providing passages through which the melted waxes and oil can drain from the solid wax. Other crystal forms of wax do not permit this ready draining of liquid from solid, but instead seem to occlude the oil and melted wax, thereby hindering or preventing draining from taking place.

We employ as our crystal form impressing agent a material of high needle wax content and prefer to employ a wax either specially prepared or selected which is made up of a preponderance of needle wax. The significance of the term "needle wax" will appear hereinafter.

We have found as a result of our research that waxes in general may logically be classified under one of three headings, namely: "Needle Wax", "Malcrystalline Wax", and "Plate Wax". These terms, while they have some relation to, are not at all synonymous with the terms "needle crystals", "malcrystalline crystals", and "plate crystals", as commonly employed in the art. Further, the terms first mentioned as employed herein, are not equivalent to the loose, indefinite meaning often attributed to such terms in common usage; for example, the term "Needle Wax" is often used by others with indifference to or lack of appreciation of the distinction which exists between what we have found to be true "Needle Wax", and those waxes which are merely of the needle crystalline form. We have found, for example, that wax may have a needle crystalline form, and yet have needle wax present in amounts to the extent of only from about 10 to about 20 per cent.

It is the true "Needle Wax", as herein set forth, which comprises the essential component of our needle crystal form impressing agent, which in accordance with our invention, is added to poorly sweating waxes to improve their sweating properties. As previously stated, a wax of good sweating properties is one which will crystallize to substantial extent in the form of needles.

Our needle waxes comprise a series of specific waxes which can best be defined by reference to the accompanying drawing. The drawing is a graph, in which the melting points of the waxes have been plotted against their refractive indices. We have found, upon determining the melting points and refractive indices respectively of a large number of our needle waxes, and plotting such coordinates, that all of our needle waxes fall within a relatively well defined area on the graph. Where $n$ represents the refractive index for the D line at 80° C., and T represents the melting point of the wax in ° C., we have found that the needle waxes of major interest in connection with our process, fall on the graph within the group of waxes having a refractive index greater than that denoted by the expression $n = 1.390 + 0.001T$. Such of the above group of waxes whose refractive indices do not exceed 1.480, more specifically 1.465, and still more specifically 1.445, and whose melting points are greater than 25° C., and more specifically, within the range of from 25° C. to 75° C., are more particularly those which we prefer to employ as our needle crystal form impressing agents.

Our needle waxes, each of which may be represented by a single point on the graph, may be produced by a series of steps involving fractional distillation and fractional crystallization from solvents, as for example, from ethylene dichloride.

Our invention is not restricted to the employment of waxes which when subjected to fractional distillation and fractional crystallization will result in the production of wax, all of the components of which come within the preferred area on the graph as above set forth. We comprehend employing a wax whose needle wax content is concentrated by special procedure according to the teaching of this invention and which, considered in a broad sense, may be composed of substantial amounts of constituents coming within the prescribed area on the graph, even though minor amounts of impurities may be present.

In our copending application Serial No. 533,486 filed April 28, 1931, we describe a series of waxes and process for their production. We have found that by employing the series of steps as described in such application, a wax is by each step improved in its crystal form impressing properties. We have found that this increase in potency of crystal form impressing properties is due to the concentration of what we call needle wax. With the understanding in mind that it is high needle wax content which we are interested in and with the understanding of how to measure the needle wax content, the exact process of producing these crystal form impressing agents can obviously be modified, any method applicable to the separation of a mixed material into its several compounds being applicable here, at least to the extent of producing some concentration of the needle wax component.

We contemplate the use, as our crystal form impressing agent, of any wax whose needle wax content has been specially concentrated in accordance with the teaching of this invention, or of any wax or wax fraction, which may be or have been produced according to known processes of wax refining, having a high needle wax content and preferably having a needle wax content of the order of 80% or upwards, a wax having a needle wax content of substantially 100% being most preferred. Herein, and in the appended claims a wax whose needle wax content has been specially concentrated, in accordance with the teaching of this invention will be known as a "specially prepared wax".

Our crystal form impressing agent is made up of waxes or wax mixtures composed primarily of needle waxes that fall within the area defined on the graph of the drawing. Impurities may be present in substantial amounts, for example, in amounts of the order of 20% or more, and still leave the wax mixture within the scope of our crystal form impressing agent. However, we prefer to employ as pure a needle wax as possible or a mixture of pure needle waxes.

To determine whether or not a certain wax or wax-oil mixture will answer the preferred requirements of our crystal form impressing agent, the following method may be suitably employed. Take a sample of the mixture under question and add thereto four times its volume of ethylene dichloride at temperatures of the order of 70° F. Then cool the mixture to 0° F. and separate the liquid from the crystallized wax as by filtration. This provides a substantially oil-free wax. This wax may then have its refractive index and melting point determined, which values will determine a point on the graph of the drawing. If the point lies to the right of the line determined by the expression $n = 1.390 + 0.001T$, above referred to, i. e., a refractive index for its melting point, which is greater than that derivable from the said expression for a similar melting point, and the loss by extraction with ethylene dichloride was not greater than substantially 20% by volume of the original wax, the wax or wax oil mixture from which the sample was taken answers the characterization of our preferred crystal form impressing agent. If, however, the refractive index-melting point coordinate of the oil-free wax is found to fall to the left of the line on the graph determined, as above, by the expression $n = 1.390 + 0.001T$, a further test will be necessary to finally determine whether or not the substantially oil-free wax contains more non-needle wax than the amount which together with the oil extracted would constitute substantially 20% of the wax or wax-oil mixture in question. This further test, if desired, may take the form of a fractional distillation by which the wax is divided into a number of close fractions. If the fractions having melting point refractive index coordinates coming within the range of our described needle wax, as shown by the graph, equal substantially 80% of the original wax or wax-oil mixture in question, such a wax is still within the contemplation of our preferred crystal form impressing agent. In making the above measurements of melting point and refractive index it is essential that the wax be a de-oiled wax, for oil has the tendency to raise the refractive index and certain oil-wax mixtures can be found having melting point refractive index properties coming within the prescribed area of our needle waxes which are low or entirely lacking in needle wax content.

However, any wax whose needle wax content has been specially concentrated is within our contemplation as a crystal form impressing agent irrespective of whether or not its needle wax content is above or below 80%. 80% is arbitrarily chosen as the point below which the needle wax content of the crystal form impressing agent preferably should not go.

We have found that a fairly definite straight line, namely $n = 1.390 + 0.001T$, can be drawn on the graph which for practical purposes may be considered as separating the range of needle wax as defined by us, from other waxes; and these needle waxes we have found have an extraordinarily powerful influence in impressing a needle crystalline form on other waxes of non-needle crystalline form; for example, on waxes of the plate type. By way of illustration, by taking a needle wax, for example, of 35° C. melting point, and a refractive index of 1.440, and mixing it with four times its amount of a plate wax of 45° C. melting point and a refractive index of 1.435, we have found that the whole mixture will crystallize in the needle form; and as a matter of fact, the mixture may even form better needle crystals than the original needle wax itself. However, if this needle crystalline mixture of needle wax and plate wax is now added to four times its amount of plate wax of 45° C. melting point, having a refractive index of 1.435, we have found that the mixture added does not have the form impressing power of the original needle wax, in that the resultant mixture will not form into crystals of the needle type. As a further illustration, we admixed with a needle wax of 45° C. melting point, having a refractive index of 1.444, four times its amount of a plate wax having a melting point of 45° C., and a refractive index of 1.434, and found, upon cooling, that the mixture would crystallize into needle crystalline form. For comparison with the previous example, this needle crystalline wax mixture, was mixed with four times its amount of a plate wax having a melting point of 45° C., and a refractive index of 1.434, and the resultant wax did not form needle crystals.

Thus it may readily be seen that it is not the needle crystals themselves that are responsible for the crystal form impressing properties of our crystal form imparting waxes, which in themselves are novel, but rather the presence in the wax mixture of adequate amounts of particular waxes, herein called needle waxes, that causes an inherently non-needle wax to crystallize as needles. Our process for improving the sweating properties of a poorly sweating wax by the addition of a wax composed essentially of needle wax as herein described, may be characterized as one in which a conditioning agent is added to the poorly sweating wax. Our process provides for substantially excluding what we have found to be the non-essential or deleterious substances and for adding what we have found to constitute the essential crystal form impressing wax components. Hence, the sweating properties of a wax may be improved according to our invention without increasing the volume of the wax to any considerable extent, whereas by proceeding, according to prior practice, it may be, and often is, necessary to add to a poorly sweating wax two or three times its amount of a good sweating wax in order to so condition the poorly sweating wax that it will correctly sweat.

The needle wax used in our process may be permitted to remain in the final sweated product, or may be separated and reused as desired. A convenient method for separating is by fractional distillation, since needle waxes of a given melting point have an appreciably higher boiling point than plate waxes of such melting point. Separation of the needle wax from the wax to which it was added, in accordance with our invention, may be illustrated by the following example, in which the sweated wax product is made up of a representative slack wax and a small amount of a needle wax, the needle wax having a melting point of 55° C., and a refractive index at 80° C. of 1.475, and a short boiling range, 50% thereof boiling off at or above 360° C. under an absolute pressure of 10 mm. of mercury; the slack wax has a boiling range of from approximately 115° C. to 300° C. From the differences in boiling ranges between the needle wax and the wax from which it is to be separated, a substantially complete separation can be made by distillation, the needle wax being left as a residuum.

When the boiling ranges of the needle wax and the other wax overlap so as to render separation by distillation difficult or non-feasible, the method of solution and fractional recrystallization of the sweated wax from ethylene dichloride or other organic solvent may be employed as a means of separation, with or without the subsequent step of vacuum distillation.

In the appended claims, where the term "needle wax" is used, it is to be understood that such term refers to needle wax as hereinabove set forth, as distinguished from mere needle crystals or needle crystalline wax. Also, the expression "wax composed substantially of needle wax", in the appended claims is to be understood to comprehend all mixtures of wax composed of preponderating amounts of needle waxes as herein set forth, which may be used to advantage to improve the sweating properties of a poorly sweating wax. Furthermore, when in the appended claims, the expression "improving the sweatability of a wax" is employed, such term is to be understood to mean either imparting sweatability to a non-sweatable wax or improving the sweating qualities of a wax which to some extent prior thereto was capable of having oil removed therefrom by customary sweating processes.

We claim:

1. A method for improving the sweatability of a wax which comprises adding to the wax a specially prepared wax having a high concentration of needle wax.

2. A method for improving the sweatability of a wax which comprises adding to the wax a second wax composed predominantly of needle wax.

3. A method for improving the sweatability of a wax which comprises adding to the wax a specially prepared wax composed predominantly of needle wax.

4. A method for improving the sweatability of a wax which comprises adding to the wax a second wax which is composed of at least substantially 80% of needle wax.

5. A method for improving the sweatability of a wax which comprises adding to the wax a specially prepared wax having a content of at least substantially 80% of needle wax, said needle wax having a refractive index at 80° C. greater than that denoted by the expression $n = 1.390 + 0.001T$, where $n$ denotes the value of the refractive index and $T$ denotes the melting point of the wax in ° C.

6. A method for improving the sweatability of a wax which comprises adding to the wax a second wax which is composed of at least substantially 80% of needle wax, said needle wax having a melting point substantially as great as that of the wax to which it is added.

7. A method for improving the sweatability of a wax which comprises adding to the wax a second wax which is composed of at least substantially 80% of needle wax, said needle wax having a melting point greater than that of the wax to which it is added.

8. In a process for improving the sweatability of a poorly sweating wax, that improvement which comprises adding to the wax in the liquid state a wax composed of a preponderating proportion of needle wax.

9. In a process for producing a higher melting wax from a wax mixture, the conditioning step which comprises mixing with the wax a small amount of a wax composed of a preponderating proportion of needle wax.

10. In a process for improving the sweatability of a hydrocarbon wax, the conditioning step which comprises adding to the wax a second wax composed of a preponderating proportion of constituents having a melting point above 25° C., and a refractive index measured at 80° C., greater than that derived from the expression $$n = 1.390 + 0.001T$$

where $n$ denotes the value of the refractive index, and $T$ denotes the melting point of the wax in ° C.

11. In a process for improving the sweatability of a hydrocarbon wax, the conditioning step which comprises adding to the wax a second wax composed of a preponderating proportion of wax components having a melting point above 25° C., and a refractive index measured at 80° C., less than 1.480 and greater than that derived from the expression $n = 1.390 + 0.001T$, where $n$ denotes the value of the refractive index and $T$ denotes the melting point of the wax in ° C.

12. In a process for improving the sweatability of a hydrocarbon wax, the conditioning step which comprises adding to the wax a second wax composed of a preponderating proportion of wax components having a melting point above 25° C., and a refractive index less than 1.465 and greater than that derived from the expression $$n = 1.390 + 0.001T,$$

where $n$ denotes the value of the refractive index, and $T$ denotes the melting point of the wax in ° C.

13. In a process for improving the sweatability of a hydro-carbon wax, the conditioning step which comprises adding to said wax a second wax composed of a preponderating proportion of wax components having a melting point above 25° C. and a refractive index less than 1.445 and greater than that derived from the expression $$n = 1.390 + 0.001T,$$

where $n$ denotes the value of the refractive index, and $T$ denotes the melting point of the wax in ° C.

14. In a process of sweating a wax, those steps which comprise adding to the wax a small amount of a wax composed predominantly of needle wax, subjecting the wax mixture so produced to the sweating operation, and removing the needle wax therefrom.

15. In a process of sweating a wax, those steps which comprise adding to the wax a small amount of a wax composed predominantly of components having a melting point above 25° C. and having a refractive index measured at 80° C. greater than that derived from the expression $$n = 1.390 + 0.001T,$$

where $n$ denotes the value of the refractive index and $T$ denotes the melting point of the wax in ° C.; subjecting the wax mixture so produced to the sweating operation; and dissolving and fractionally recrystallizing the sweated, composite wax with an organic solvent, thereby effecting a separation of needle wax from the sweated wax.

16. In a process of sweating a wax, those steps which comprise adding to the wax a small amount of a wax composed predominantly of components having a melting point above 25° C. and having a refractive index measured at 80° C. greater than that derived from the expression $$n = 1.390 + 0.001T,$$

where $n$ denotes the value of the refractive index and $T$ denotes the melting point of the wax in ° C.; subjecting the wax mixture so produced to the sweating operation; and dissolving and fractionally recrystallizing the sweated, composite wax with ethylene dichloride, thereby effecting a separation of needle wax from the sweated wax.

17. In a process of sweating wax those steps which comprise adding to the wax a small amount of a wax composed predominantly of needle wax; subjecting the wax mixture so produced to the sweating operation; and subjecting the sweated, composite wax to a fractional distillation, thereby to effect a separation of needle wax from the sweated wax.

18. In a process of sweating wax those steps which comprise adding to the wax a small amount of a wax composed predominantly of needle wax; subjecting the wax mixture so produced to the sweating operation; and subjecting the sweated, composite wax to a fractional distillation under vacuum, thereby to effect a separation of needle wax from the sweated wax.

19. In a process for sweating wax those steps which comprise adding to the wax a small amount of a wax composed predominantly of needle wax, subjecting the wax mixtures so produced to a sweating operation, subjecting the sweated, composite wax to fractional distillation, thereby to effect a separation of the needle wax added from the wax mixture, thereafter adding such needle wax to wax to be sweated, and subjecting the wax mixture so produced to a sweating operation.

LAWRENCE M. HENDERSON.
SEYMOUR W. FERRIS.
HENRY C. COWLES, Jr.